Feb. 13, 1951  R. W. CALLAGHAN ET AL  2,541,859
DEHYDRATED APPLE
Filed Aug. 14, 1948  2 Sheets-Sheet 1
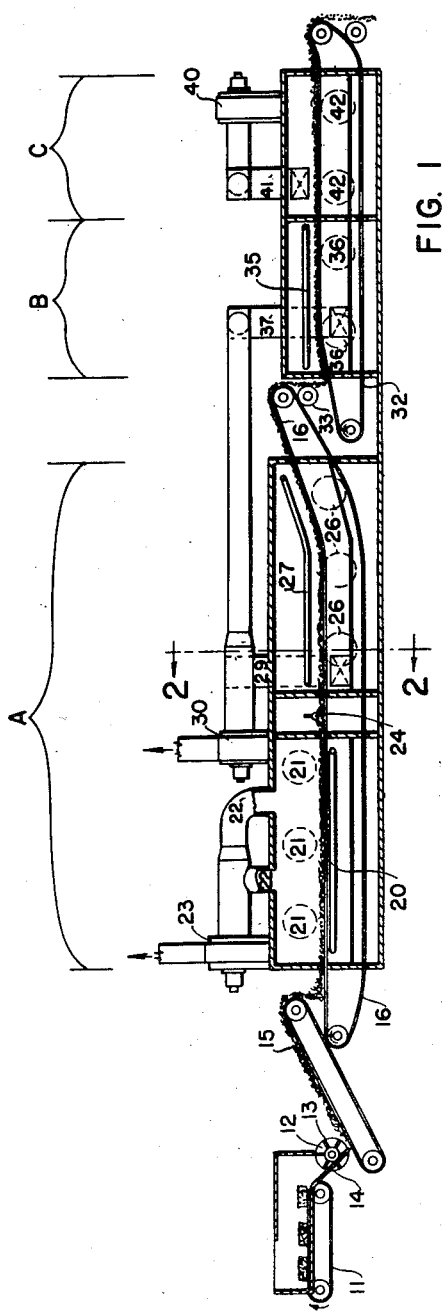
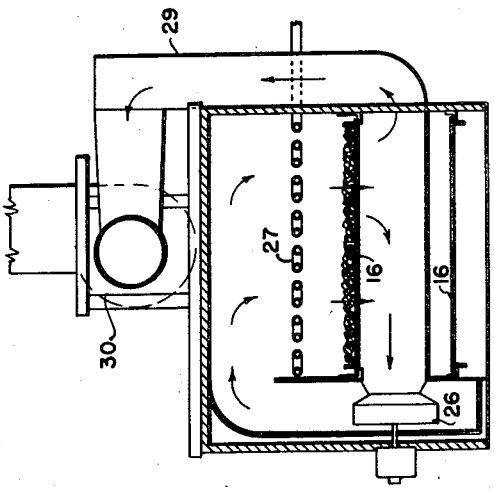
INVENTORS
ROBERT. W. CALLAGHAN
LAWRENCE W. BERGLUND
BY Anthony A. Juettner
ATTORNEY INVENTORS
ROBERT W. CALLAGHAN
LAWRENCE W. BERGLUND
BY Anthony A. Juettner
ATTORNEY Patented Feb. 13, 1951

2,541,859

UNITED STATES PATENT OFFICE 2,541,859

DEHYDRATED APPLES

Robert W. Callaghan and Lawrence W. Berglund, Minneapolis, Minn., assignors to General Mills, Inc., a corporation of Delaware Application August 14, 1948, Serial No. 44,366

6 Claims. (Cl. 99—204)

The present invention relates to a novel process for dehydrating evaporated apples and to the resultant product.

The dried apple product available on the market, known to consumers as "dried apples," is known in the trade as "evaporated apples." This product conventionally has approximately 24% moisture and possesses the typical tough leathery appearance commonly associated with this product. The product is generally in disrepute and ordinarily does not not function as a substitute for fresh apples in various cooked or baked products. The product conventionally contains upwards of 500 parts per million of sulfur dioxide, which is necessary as a preservative. This quantity of sulfur dioxide has an effect on the taste which renders the product undesirable. All in all, the product has not been particularly satisfactory and has been considered definitely inferior to fresh apples for cooking purposes.

Various attempts have been made to improve on the commercial evaporated apples and these attempts have usually involved vacuum dehydration of the evaporated apples to a lower moisture content. This vacuum evaporation results in a substantial removal of sulfur dioxide and at the same time lowers the moisture content to the point where the dried product will keep without the presence of quantities of sulfur dioxide which have an effect on the taste or flavor of the product. These vacuum dried products have met with some success. They have, however, left much to be desired. In the first place, the cost of vacuum evaporation is almost prohibitive, and as a result, the cost of the vacuum dried apples is considerably higher than that of evaporated apples, and approaches that of fresh apples. Moreover, although a major proportion of the sulfur dioxide has been removed, the vacuum drying has resulted in an impairment in the apple flavor. Furthermore, the rate of rehydration and the ultimate extent of rehydration have left much to be desired. Thus vacuum dried apples do not rehydrate to the extent that the original apples were hydrated, and as a result, the rehydrated product has a lesser volume than would the fresh product, and moreover the rehydrated product is not as tender as the fresh product. The reduced volume of the rehydrated product requires the use of a larger quantity of vacuum dried apples to give a desired volume of product, as for example, the volume of product required to make a pie filling.

It has now been discovered that it is possible to obviate most of the difficulties of the prior art. By means of the present invention it is possible to avoid the necessity for vacuum drying to produce an apple product of low moisture content and of low sulfur dioxide content. Moreover, it is possible by this means to produce a dehydrated apple product which will rehydrate better than the vacuum dried products of the prior art. The present product will not only rehydrate at a faster rate, but will rehydrate to a higher ultimate moisture content. Moreover, it has been found that the volume of the rehydrated product is greater than that of the same weight of vacuum dried apples. It is thus possible to use a quantity of dehydrated apples which is more nearly equivalent to the quantity of fresh apples used. Thus, for example, with a commercially available vacuum dried apple product, it has been found necessary to use about 85 grams of the vacuum dried apple product and about 1⅔ cups of water to prepare a pie filling. With the dehydrated apple product of the present invention it has been found that the amount of apples may be reduced to 75 grams and that 2 cups of water may be used. Thus it is possible to actually reduce the quantity of apples and to increase the quantity of water, and as a result, the filling obtained has a large volume and a greater weight and more nearly resembles the filling prepared from fresh apples than does the filling prepared from vacuum dried apples. The difference in rehydration properties of the vacuum dried product and the dehydrated product of the present invention is further demonstrated by the fact that the apples in a pie filling prepared from vacuum dehydrated apples may contain as little as 88% of the moisture in the apples of a filling prepared from fresh apples, whereas with the present product the apples in a pie filling may contain 95% of the moisture found in the apples in a filling prepared from fresh apples.

It is therefore an object of the present invention to provide a novel process of dehydrating evaporated apples.

It is a further object of the present invention to provide a novel dehydrated apple product characterized by improved flavor, improved rehydration characteristics, and by a low content of sulfur dioxide.

While the present invention relates to the subsequent dehydration of evaporated apples, it is believed the invention is better understood by a complete description of the conventional evaporation process, of the manner in which this process is modified herein, and of the subsequent dehydration of the evaporated apples to a low moisture content. Apples are preferably evaporated at the proper stage of maturity. Immature apples will produce dehydrated products which will cook or bake up into tough slices, whereas the product obtained from overripe apples will yield apple slices which are mushy and overcooked. The properly matured apples are first classified according to size inasmuch as some of the seed celling equipment is fixed, and a constant seed cell section is removed despite the size of apple. The classified apples are then fed to apple machines which remove the peel, core the apple and cut out the seed cells.

The peeled and cored apples are then subjected to slicing in the form of rings which conventionally in the industry are approximately ⅜ inch thickness, although in some instances slices as large as one-half inch have been used. The ⅜ inch thickness has represented a minimum in the industry, and heretofore it has not been thought possible to reduce the size of the slice materially below this inasmuch as it was felt that the apples would not dry, trat the apple slices thus obtained would be too fragile, and that too many fines would result.

The sliced apples are then subjected to a sulfite spray for the purpose of treating the newly exposed surfaces. The apple slices are next subjected to a final inspection prior to drying. Conventionally, evaporation is carried out in either kiln or tunnel driers. In kilns sulfur is usually burned for about the first half hour of drying to prevent browning, whereas in tunnels the prepared fruit is treated in a sulfur chamber immediately before drying, to accomplish the same end. The drying times average from four to six hours, at which time the moisture is reduced from the original 85% to approximately 15%. Drying-air temperatures vary from 140–170° F. Drying is conventionally carried down to a level of about 16–20%, at which point the evaporated apples are rewashed and scrubbed to clean them somewhat and also to increase the moisture content to approximately 24%. The apples are then treated with sufficient sulfur dioxide to stabilize them and the increase in moisture from the original drying moisture is necessary to permit the $SO_2$ to be absorbed.

In preparing dehydrated apples according to the present invention, some variations are necessary in the conventional evaporation process. The whole apples after coring and peeling are subdivided into halves or thirds by passing the apple through a cutting head which slices the fruit parallel to the core axis. This not only exposes the center of the apple for inspection but also permits the seed cell to be removed and reduces the size of the pieces for further slicing. The halves or thirds of apples are then tumbled in a rotary inclined screen and are subjected to a vigorous spray of wash water. This removes the loose core and seed cell pieces and also removes some of the softer bruised areas. Thereafter, the pieces are passed through a dilute sodium sulfite dip which causes sufficient absorption of $SO_2$ so that no discoloration or browning takes place in subsequent steps until the apples are further sliced. The apples may then be subjected to an inspection where insufficiently prepared apples are treated for removal of bruises, peel, and core.

It has been found that it is essential to slice the fresh apples considerably thinner than is conventional. It is preferred that the apple slices be as close to one-quarter of an inch thick as possible although some slight variation of approximately 1/16 up to about 1/8 of an inch may be made. The slices should also have a width of from ¾ to 1⅛ inches. With these exceptions, particularly the thickness of the slice, the evaporation process may follow the conventional process down to the point of rewashing of the evaporated apples.

Inasmuch as according to the present invention further dehydration is carried out, the step of rewashing is eliminated. Likewise the step of resulfuring is eliminated inasmuch as the ultimate moisture content of the present product is so low that sulfur dioxide is unnecessary for stabilization. While it is desirable, therefore, to operate with evaporated apples which have not been remoistened and which conventionally contain a moisture content of from 16–20%, it is apparent that it is also possible to operate on evaporated apples having moisture contents up to 24%. It is likewise apparent that in some evaporating processes the lower moisture content may be below 16% somewhat and obviously it is possible to employ such apples in the present dehydration process. It is of course most economical to employ evaporated apples having the lowest moisture content that can be obtained in the evaporation process.

Evaporated apples are commonly packed in cardboard or wooden boxes and in view of their relatively high moisture content tend to form cakes. In the present invention, the evaporated apples are first removed from the packing cases in the form of relatively cohesive blocks of apple pieces, and are then subjected to a breaking operation for the purpose of separating the apple slices. The apples are next spread out on an endless belt conveyor and subjected to air at a temperature of approximately 180° F., although temperature variations within the range 150–190° F., preferably 170–190° F. may be employed. The actual temperature employed may depend to some extent upon the maturity of the apples. The more mature the apple, the more sensitive it may become to heat. Thus maturity increases sugar content and acidity, and with a mature apple it may be desirable to maintain the temperature at 180° F. or lower.

The time period involved for dehydration is subject to considerable variation depending upon the condition of the evaporated apples used in starting, the final moisture content desired, the temperatures employed, and the particular equipment available. With a drier of the type illustrated in the drawing the time period may be approximately two hours, when the air temperature employed is approximately 180° F. and the evaporated apples fed to the drier have a moisture content of about 20%, and where the moisture content of the finished apples is approximately 5%. This drying was obtained when an 8-inch layer of apple slices on the conveyor was employed. With this type of equipment and such a layer of apples, the time period may vary from one and one-half to two and one-half hours, depending upon the temperature conditions and the initial and final moisture content. It will be apparent that by loading the drying equipment with a lesser load of apple slices that the time period may be reduced substantially, as for example, down to a time period of about one hour. Similarly where lower temperatures are employed, or where the initial moisture content is near the upper part of the range, and the final moisture content desired is low, the time period for this particular equipment may be extended somewhat to three hours or more. With other types of equiment, as for example with tunnel driers, the time period involved may be as long as 8–12 hours. Any of these methods of drying or these types of drying equipment may be employed as long as the temperature conditions are maintained as specified and as long as the moisture content is reduced to a maximum of 6%, and preferably below 5%. Usually it is not necessary to go below 3%.

During the course of the drying, the apples are subjected to at least one point of agitation for the purpose of separating clumps of apples and to insure adequate drying. When the apples have been dried to a moisture content of about 5%, they are definitely plastic in the warm condition and tend to cake. For this reason it is necessary to cool the apples to about 100° F. before attempting to pack them. This may be accomplished by passing the belt through a cooling section in which cooling air is blown over or through the apples.

The cooled product, having a moisture content of about 5% is not fully crisp and is somewhat plastic. At the same time it does not tend to cake and is free-flowing. The sulfur dioxide content of the dried apples is frequently as low as one hundred parts per million, and usually not in excess of one hundred fifty. On occasion the sulfur dioxide content may rise as high as two hundred parts per million. The finished dehydrated apple slices usually have a thickness of from $\frac{1}{16}$ to $\frac{1}{8}$ inch and are generally flat. The slices are substantially free from concave surfaces. This is to be compared with the exaporated apples prepared from apple slices $\frac{3}{8}$ inch thick. Such evaporated apples have concave surfaces showing that the apple has collapsed in the middle of the slice but has retained its shape at the edges. Such collapsed slices are unsightly and give the appearance of a poor product. Furthermore, this collapse of the apple has an effect upon its rehydration properties.

In the drawings, there has been illustrated more or less diagrammatically, an apparatus in which the process of the present invention can be readily carried out, and there is illustrated a comparison of the present product with other products.

Figure 1 is a side elevation partly in section illustrating a suitable apparatus:

Fig. 2 is a cross-section taken along the line 2—2 of Figure 1; and

Figure 3:
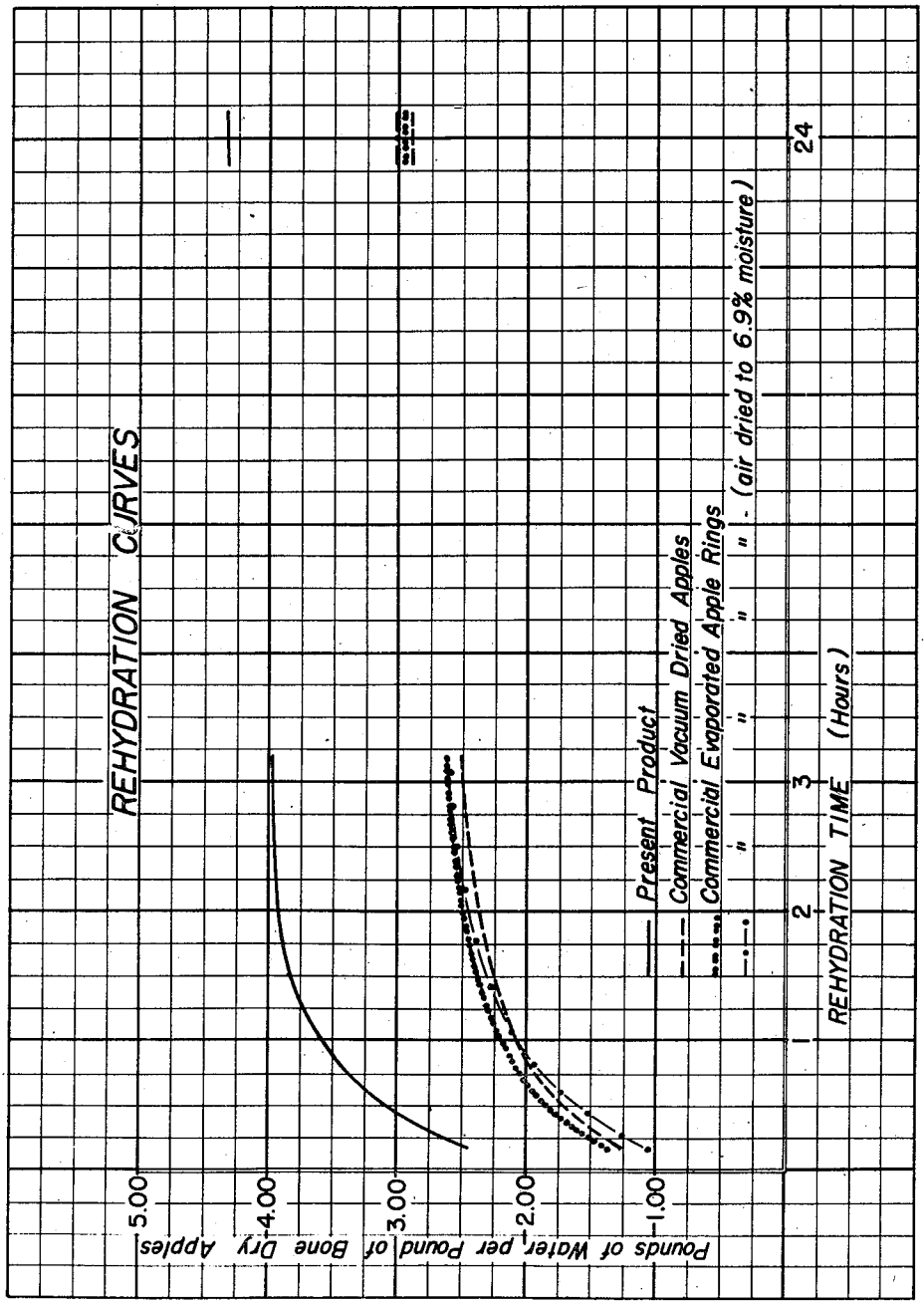
Fig. 3 illustrates relative rehydration characteristics of the present product in comparison to various other dehydrated products.

With particular reference to Figure 1, the evaporated apples having a moisture content of about 16–24% are uncrated and placed on conveyors 11. The blocks of apples are conveyed to the end of the conveyor and are there dropped into breaker 12 which may be composed of a plurality of fingers 13 which interdigitate between breaker bars 14. As the fingers 13 rotate about the shaft on which they are mounted, the blocks of apples are separated into apple slices which are then conveyed upwardly along feeder conveyor 15 and dropped from the end of this conveyor onto conveyor 16 of the drier. The drier illustrated is one having a first drying section generally indicated as A, a second drying section B, and a cooling section C. The conveyor 16 may be of any suitable type, as for example, a perforated metallic belt having perforations therein of a size sufficient to permit the apple slices to be supported, while at the same time permitting air to pass through the conveyor belt.

In the drier the apple slices are subjected to air at a temperature of approximately 180° F. The air is suitably circulated through the apples after having been heated. In the left-hand end of section A there is illustrated steam coils 20 below the upper flight of the conveyor 16. The air is locally recirculated by means of fans 21 which are disposed above the upper flight of the conveyor and withdraw air and blow it back beneath the heating coils 20. Suitable discharge outlets 22 are provided in the top of the drying chamber and these lead to a discharge fan 23 for the discharge of moisture laden air. Air for makeup may be supplied by means of draft doors disposed along the side of the drier.

In the middle of section A there is illustrated an agitator 24 which serves to redistribute the apples on the conveyor belt and to expose new surfaces as well as for the purpose of breaking up any clumps which may have formed or which may have been present in the original charge. In the righthand end of section A the direction of air movement is in reverse. The air is withdrawn below the bed of apples by means of blowers 26, which then recirculate the air and force it through heating coil 27 and down through the top of the bed. This part of section A is provided with discharge outlet 29 and blower 30 for the discharge of moisture laden air.

As the apples leave the end of section A, the conveyor carries them somewhat upwardly, and discharges them onto conveyor 32 of section B of the drier. As the apple slices are discharged from the end of conveyor 16, they pass over doffer 33, which serves the function of assisting in the removal of the apple slices from the conveyor and also serves to agitate them somewhat to redistribute them on conveyor 32. In drying section B the apple slices are subjected to essentially the same conditions that they were in section A. The temperature is maintained at about the same range by means of steam coils 35. The air in this section is circulated by means of blowers 36 similar to the blowers in the remaining sections. Air is exhausted from this drying section by means of outlet 37 which is connected with fan 30.

After the apples have been sufficiently dried in section B, the conveyor 32 carries them into cooling section C, in which the apple slices are subjected to suitable cooled air for the purpose of reducing the temperature of the apples to below 100° F. For this purpose blower 40 draws air from the cooling section through outlet 41. This permits fresh cool air to be drawn into the cooling section through suitable draft doors. The cooling section is likewise provided with recirculating fans 42 for locally recirculating the cooling air in the manner that the drying air is recirculated in the other sections.

Conveyors 16 and 32 pass through suitable openings in the end walls of the various sections such that it is possible to locally control the temperature and relative humidity of the air in the drier, and to prevent undue access of atmospheric air to the material in the drier. The conveyor 32 is likewise passed through suitable openings in the wall separating sections B and C for the purpose of maintaining these two sections as separate as possible.

In Fig. 2 the recirculation within the section is illustrated as well as the outlet for discharge of moisture laden air to the atmosphere.

In Fig. 3 there is illustrated a series of curves illustrating the rate of rehydration as well as the equilibrium moisture content of the series of dehydrated apple products. The products tested are shown by the legend and include the product of the present invention identified as "Present product," a commercially vacuum-dried apple product so designated, a commercially available evaporated apple ring product which is typical of the evaporated apple products available on the market, and for the purpose of illustrating the importance of slice thickness, there has been included a sample of commercially evaporated apple rings which have been subsequently air-dried to a moisture content of the order of 6.9%.

The test was conducted by taking fifty grams of each of the products named, and placing each such sample in a wire mesh basket and immersing all of the basket simultaneously in a common container filled with water at 80° F. Weight readings were taken at elapsed time periods of 15, 30, 60, 120, 180 minutes, and at 24 hours. At these time periods the baskets were withdrawn and allowed to drain for two minutes and were then weighed. The increases in weight were then calculated to the bone dry basis, and were then plotted against the elapsed time to produce the curves illustrated in Fig. 3. These curves illustrate that the present product not only rehydrates faster, but actually rehydrates to a higher ultimate moisture content. At the same time, the volume of the rehydrated product is greater than are the volumes of the various other products illustrated. The phenomenal difference in products is readily available from this illustration.

The superiority of the present product over vacuum-dried apples is further demonstrated by the following data: A survey was made to determine the preference of consumers for pies containing filling prepared from the apples herein described and claimed, as compared with pies prepared from vacuum-dried apples. In this test all factors were constant save for the difference in apples. The results obtained are as follows:

| Features of Pie | Percentage of Total Consumers Interviewed Preferring | |
|---|---|---|
| | Present Product | Vacuum-Dried Apples |
| Over-all | 67.4 | 28.5 |
| Filling | 70.7 | 24.4 |
| Eating quality of apples | 61.0 | 17.1 |
| Flavor of apples | 56.1 | 25.2 |

These data show the pronounced superiority of the presently claimed product as compared with the best dehydrated product available heretofore.

While various modifications and specific embodiments of the invention have been described, it is to be understood that numerous modifications are possible without departing from the spirit of the invention. Thus those skilled in the art will readily realize that the process herein described may be carried out in numerous other types of apparatus than that illustrated.

We claim as our invention:

1. Process of dehydrating apples which comprises preparing apple slices having a thickness within the range of $\frac{3}{16}$ to $\frac{5}{16}$ of an inch, air-drying the apple slices to a moisture content within the approximate range of 16–24% to produce evaporated apples, thereafter subjecting the evaporated apples without a resulfuring treatment and without substantial disintegration of the apple slices to air-drying at temperatures within the approximate range of 150–190° F. to dry the apple slices to a moisture content not substantially in excess of 6% to produce a product of low sulfur dioxide content which does not affect the taste.

2. Process of dehydrating apples which comprises preparing apple slices having a thickness within the range of $\frac{3}{16}$ to $\frac{5}{16}$ of an inch, air-drying the apple slices to a moisture content within the approximate range of 16–24% to produce evaporated apples, thereafter subjecting the evaporated apples without a resulfuring treatment and without substantial disintegration of the apple slices to air-drying at temperatures within the approximate range of 150–190° F. for a time period of from one and one-half to two and one-half hours to dry the apple slices to a moisture content not substantially in excess of 6% to produce a product of low sulfur dioxide content which does not affect the taste.

3. Process of drying apples which comprises subjecting evaporated apples prepared from apple slices having a thickness within the range of $\frac{3}{16}$ to $\frac{5}{16}$ of an inch, to an air-drying process without a resulfuring treatment, and without substantial disintegration of the apple slices in which the evaporated apples are subjected to air temperatures within the approximate range of 170–190° F. for a time period of approximately one and one-half to two and one-half hours to reduce the moisture content of the evaporated apple slices to not substantially in excess of 6% to produce a product of low sulfur dioxide content which does not affect the taste.

4. Process of preparing dehydrated apples which comprises preparing apple slices having a thickness within the approximate range of $\frac{3}{16}$ to $\frac{5}{16}$ of an inch and a width of from $\frac{3}{4}$ to $1\frac{1}{2}$ inch, air-drying said apple slices to a moisture content within the approximate range of 16 to 24% to produce evaporated apple slices, subjecting said evaporated apple slices without a resulfuring treatment and without substantial disintegration of the apple slices to a further air-drying process in which the apple slices are subjected to air temperatures within the approximate range of 170–190° F. for a period of time within the approximate range of one and one-half to two and one-half hours, the apple slices being agitated at some point during said dehydration process, and thereafter cooling the apple slices to a temperature of not more than 100° F. to produce a product of low sulfur dioxide content which does not affect the taste.

5. A dehydrated apple product characterized by a moisture content not in excess of 6%, by a sulfur dioxide content not in excess of 200 parts per million, by an improved apple flavor, and by improved rehydration characteristics, said product being in the form of somewhat plastic slices having a substantially uniform thickness of from $\frac{1}{16}$ to $\frac{1}{8}$ inch, and being generally flat and substantially free from concave surfaces, said product being obtained by the air-drying of evaporated apples prepared from apple slices having a thickness of approximately ¼ inch, said dehydration having been effected at temperatures within the approximate range of 170–190° F. for a time period of from one and one-half to two and one-half hours.

6. A dehydrated apple product characterized by a moisture content not in excess of 6%, by an improved apple flavor, and by improved rehydration characteristics, said product being in the form of somewhat plastic slices having a substantially uniform thickness of from $\frac{1}{16}$ to ⅛ inch, and being generally flat and substantially free from concave surfaces, said product being obtained by the air-drying of evaporated apples prepared from apple slices having a thickness of approximately ¼ inch, said dehydration having been effected without a resulfuring treatment, at temperatures within the approximate range of 150–190° F. for a time period of from one and one-half to two and one-half hours.

ROBERT W. CALLAGHAN.
LAWRENCE W. BERGLUND.

REFERENCES CITED

The following references are of record in the file of this patent:

UNITED STATES PATENTS

| Number | Name | Date |
|---|---|---|
| 1,259,634 | King | Mar. 19, 1918 |
| 1,929,437 | McComb | Oct. 10, 1933 |
| 2,110,184 | Webb | Mar. 8, 1938 |
| 2,451,312 | Arengo-Jones | Oct. 12, 1948 |

FOREIGN PATENTS

| Number | Country | Date |
|---|---|---|
| 457,088 | Great Britain | Nov. 20, 1936 |